(12) United States Patent
Pallardy et al.

(10) Patent No.: US 12,159,043 B2
(45) Date of Patent: Dec. 3, 2024

(54) DYNAMIC MANAGEMENT OF A MEMORY FIREWALL

(71) Applicant: STMicroelectronics (Grand Ouest) SAS, Le Mans (FR)

(72) Inventors: Loic Pallardy, Rouillon (FR); Michel Jaouen, Yvre L'eveque (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 204 days.

(21) Appl. No.: 17/989,389

(22) Filed: Nov. 17, 2022

(65) Prior Publication Data

US 2023/0161484 A1    May 25, 2023

(30) Foreign Application Priority Data

Nov. 25, 2021    (FR) ........................................ 2112497

(51) Int. Cl.
*G06F 3/06* (2006.01)

(52) U.S. Cl.
CPC .......... *G06F 3/0622* (2013.01); *G06F 3/0655* (2013.01); *G06F 3/0673* (2013.01)

(58) Field of Classification Search
CPC .... G06F 3/0622; G06F 3/0655; G06F 3/0673; G06F 12/0284; G06F 21/53; G06F 21/70; G06F 21/74; G06F 12/145; G06F 2212/1052; G06F 15/7807; G06F 12/1416; G06F 15/167; G06F 21/6218; G06F 2221/2141
See application file for complete search history.

(56) References Cited

U.S. PATENT DOCUMENTS

| 10,037,439 | B2* | 7/2018 | Anderson | G06F 21/79 |
| 10,068,110 | B2* | 9/2018 | Chun | G06F 12/14 |
| 2006/0143411 | A1 | 6/2006 | O'Connor | |
| 2008/0163359 | A1* | 7/2008 | Conti | G06F 21/71 726/17 |
| 2018/0204024 | A1* | 7/2018 | Lillibridge | G06F 3/0659 |

(Continued)

FOREIGN PATENT DOCUMENTS

| EP | 1563375 A1 | 8/2005 |
| FR | 3090923 A1 | 6/2020 |
| WO | 2004046924 A1 | 6/2004 |

(Continued)

*Primary Examiner* — Zhuo H Li
(74) *Attorney, Agent, or Firm* — Slater Matsil, LLP (57) ABSTRACT

In embodiments, a system includes a first and a second processing unit, a memory, and a firewall device. The first processing unit operates in a secure mode and generates memory access requests having a secure level. The second processing unit operates in a non-secure mode and generates memory access requests having a non-secure level. The memory includes a first memory area that can be shared between the first and second processing units. The firewall device includes a first firewall circuit with a first configuration authorizing access to the first memory area in the presence of a secure or non-secure level access request. The firewall circuit includes a second configuration prohibiting access to the first memory area in the presence of a secure level access request and authorizing access to the first memory area only in the presence of a non-secure level access request.

20 Claims, 3 Drawing Sheets

(56) References Cited

U.S. PATENT DOCUMENTS

2021/0232337 A1* 7/2021 Talvitie ................ G06F 3/0655
2023/0015027 A1* 1/2023 Jaouen ................ G06F 12/1441

FOREIGN PATENT DOCUMENTS

| WO | 2013156315 A1 | 10/2013 |
| WO | 2016166450 A1 | 10/2016 |
| WO | 2017019061 A1 | 2/2017 |

* cited by examiner

DYNAMIC MANAGEMENT OF A MEMORY FIREWALL

CROSS-REFERENCE TO RELATED APPLICATIONS

This application claims priority to French Application No. 2112497, filed on Nov. 25, 2021, which application is hereby incorporated by reference herein in its entirety.

TECHNICAL FIELD

The present disclosure generally relates to memory devices, and in particular embodiments, to a dynamic management of a firewall device associated with memory.

BACKGROUND

In current system on a chip (SoC) circuits, there are generally several execution contexts, based on one or more microprocessors, which can have levels called secure levels or levels called non-secure levels. Typically, an execution context, or execution environment, implements firmware and registers. When the execution context or environment is secure, the firmware is secure as well as the registers of the microprocessor associated with the execution context.

By way of a non-limiting example, secure firmware can be signed firmware whose signature has been verified before it is loaded into the corresponding program memory. When the execution context or environment is non-secure, the corresponding firmware and the corresponding registers are non-secure.

For example, an operating system can provide an execution context of secure level and an application execution context, for example, for a multimedia application, of non-secure level.

In some cases, it may be advantageous for a memory or memory area to be shared between secure and non-secure execution contexts.

In other words, in this case, it may be advantageous for a secure level transaction or a non-secure level transaction to be able to access this shared memory.

Currently, to enable this functionality, use is made of a management memory unit (MMU), a memory protection unit (MPU), or a security attribution unit (SAU) coupled between the microprocessor(s) implementing secure and non-secure execution contexts, and the shared memory.

In practice, any non-secure memory area is accessible by a secure context thanks to the MPU, MMU, or SAU unit. Indeed, on the secure execution context side, as soon as a memory area is declared non-secure in the MPU, MMU, or SAU unit, any access to this memory area is performed as non-secure access. In other words, there is a degradation in the level of the transaction (from secure to non-secure) performed in the MPU, MMU, or SAU.

There are currently two ways to do this. According to the first way, the non-secure execution context allocates a predefined shared memory area. And this shared predefined memory area is declared in the MMU, MPU, or SAU unit as non-secure to allow access to secure transactions emitted from the secure execution context. But this shared memory area is fixed. Therefore, the size of this memory area must be defined when defining the product. Its predefined size can be a problem for some non-secure multimedia applications requiring more memory space.

Alternatively, the non-secure execution context allocates a memory area in the non-secure memory and then shares it with a secure execution context. The secure execution context will then program the MMU, MPU, or SAU unit to be able to access this non-secure shared memory area.

But, if the non-secure execution context (or application) is interrupted (or stopped), the secure execution context (or application) remains operational. It can still have access to the non-secure memory area. And this memory area can be recycled by the system and could be reallocated to another non-secure application. And since the secure application still has access to this memory area, it could corrupt or read data from the new non-secure application.

In other words, in this case, the secure execution context has direct access to the non-secure memory area without control by the non-secure execution context.

Therefore, there is a need to manage more efficiently and securely access rights to a memory shared between a secure execution context and a non-secure execution context.

SUMMARY

According to one embodiment and implementation, it is proposed to dynamically manage the access rights to this shared memory directly at the firewall associated with this memory area and to entrust the management of this firewall to the context of non-secure execution which is in charge of the non-secure part of the memory within which it is planned to implement this shared memory area.

According to one aspect, a system is proposed, for example, a system on a chip, including a first processing unit configured to operate in a secure mode and generate memory access requests having a secure level, and a second processing unit configured to operate in a non-secure mode and generate memory access requests having a non-secure level.

The two processing units can respectively form part of two different microprocessors.

It is also possible that the system includes a microprocessor having a first operating system configured to operate in a secure level execution context and forming the first processing unit and a second operating system configured to operate in a non-secure level execution context and forming the second processing unit.

The system also includes a memory, including a first memory area that can be shared between the first processing unit and the second processing unit, as well as a firewall device coupled between the memory and the first and the second processing units.

This firewall device includes a first firewall circuit associated with the first memory area, configurable by the second processing unit.

The first firewall circuit includes a first configuration wherein they authorize access to the first memory area in the presence of a secure level access request or the presence of a non-secure level access request, and a second configuration wherein they prohibit access to the first memory area in the presence of a secure level access request and authorize access to the first memory area only in the presence of a non-secure level access request.

Thus, the management of access to this first shared memory area is provided at the firewall itself, which is configurable by the second processing unit.

According to one embodiment, the memory includes a memory region allocated to the second processing unit and containing the first memory area. And the second processing unit is configured to define the first memory area within the memory region.

In other words, the non-secure context (second processing unit) to which the memory region is allocated can decide which part of this memory region it wishes to share with the secure context.

According to one embodiment, the memory moreover includes a second memory area allocated to the first processing unit, and the memory region includes a third memory area reserved for the second processing unit.

The firewall device then includes a second firewall circuit associated with the second memory area and configured to authorize access to the second memory area only in the presence of secure level requests, and a third firewall circuit associated with the third memory area and configured to authorize access to the third memory area only in the presence of non-secure level requests.

According to one embodiment, the memory access requests may include indications representative of the secure or non-secure level of these requests.

The first, second, and third firewall circuit then include, for example, sets of registers respectively associated with the three memory areas and containing pieces of information representative of the secure or non-secure access rights to these memory areas, as well as verification circuit configured to compare the indication of a request for access to a memory area with the pieces of information contained in the corresponding set of registers and to authorize or prohibit access to the memory area according to the result of the comparison.

And the content of the register(s) associated with the first memory area can be modified upon command from the second processing unit.

This command from the second processing unit can, for example, pass through a configuration controller, which will modify the content of the register(s) associated with the first memory area.

The system advantageously includes a management memory unit coupled between the firewall device and the two processing units. And the management memory unit is configured not to degrade the security level of an access request having a secure level.

In other words, unlike the prior art, it is not necessary to reprogram the management memory unit to authorize a secure access request to access the first memory area since it is the firewall associated with this first memory area that will authorize or prohibit access to this request. In other words, the access request, which has a secure level and which is delivered to the management memory unit, leaves this management memory unit also with the secure access level.

According to another aspect, a method is proposed for managing access to a memory of a system, for example, incorporated within a system on a chip.

The system includes a first processing unit operating in a secure mode and generating memory access requests having a secure level, a second processing unit operating in a non-secure mode and generating memory access requests having a non-secure level, the memory including a first memory area shared between the first processing unit and the second processing unit, a firewall device coupled between the memory and the first and second processing units, having first configurable firewall circuit associated with the first memory area.

In the method according to this aspect, the second processing unit configures the first firewall circuit to place them in a first configuration wherein they authorize access to the first memory area in the presence of a secure level access request or the presence of a non-secure level access request, or to place them in a second configuration wherein they prohibit access to the first memory area in the presence of a secure level access request and authorize access to the first memory area only in the presence of a non-secure level access request.

According to one embodiment, the memory includes a memory region allocated to the second processing unit and containing the first memory area, and the second processing unit defines the first memory area within the memory region.

According to one implementation, the memory includes a second memory area allocated to the first processing unit and the memory region includes a third memory area reserved for the second processing unit, and the firewall device is equipped with second firewall circuit associated with the second memory area and authorizing access to the second memory area only in the presence of secure level requests, and third firewall circuit associated with the third memory area and authorizing access to the third memory area only in the presence of non-secure level requests.

BRIEF DESCRIPTION OF THE DRAWINGS

Other advantages and features of the invention will become apparent upon examining the detailed description of non-limiting embodiments and implementations of the invention, and from the accompanying drawings in which.

DETAILED DESCRIPTION OF ILLUSTRATIVE EMBODIMENTS

Figure 1:
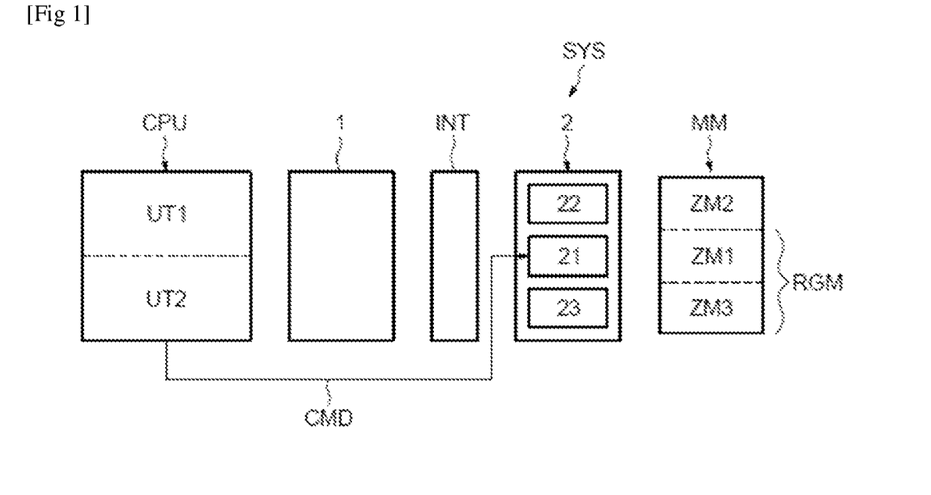
FIG. 1 is a block diagram of an embodiment system.

In FIG. 1, the reference SYS designates a system, for example, but in a non-limiting manner, a system on a chip (SoC), for example, but in a non-limiting manner, a system on a chip of the type described in French patent application no 3103586 including several master pieces of equipment, several slave resources, and an interconnection circuit coupled between the master pieces of equipment and the slave resources and able to route transactions between master pieces of equipment and slave resources.

The person skilled in the art may, for all practical purposes, refer to this aforementioned French patent application, the content of which is hereby incorporated by reference herein in its entirety.

In the example of system SYS described here, the reference CPU designates a master piece of equipment, for example, a microprocessor, including a first processing unit UT1 and a second processing unit UT2.

In embodiments, the microprocessor CPU includes a first operating system configured to operate in a secure level execution context and forming the first processing unit UT1 and a second operating system configured to operate in a non-secure level operating context, for example, a multimedia application, and forming the second processing unit UT2.

Of course, it would be possible to provide two distinct microprocessors incorporating the two processing units UT1 and UT2.

The system SYS here also includes a memory MM which can be, in the case of a system on a chip, a slave resource.

The memory MM here includes a memory region RGM allocated to the second processing unit UT2, including a first memory area ZM1 and a third memory area ZM3.

In embodiments, the first memory area ZM1 is shared between the first processing unit UT1 and the second processing unit UT2 to optionally receive secure level memory access requests or non-secure level memory access requests.

In embodiments, the third memory area ZM3 receives only non-secure level memory access requests.

The memory MM also includes a second memory area ZM2 allocated to the first processing unit UT1 and intended to receive only secure level memory access requests.

The system SYS also includes a management memory unit (MMU) or else a memory protection unit (MPU), or else a security attribution unit (SAU) referenced by reference 1.

The structure of such a unit is conventional and known per se.

This unit 1 is coupled to the microprocessor CPU.

When the system is a system on a chip, it also generally includes an interconnection circuit INT intended to route the requests or transactions emitted by the various master pieces of equipment including the microprocessor CPU, to the slave resources. Such an interconnection circuit is, for example, mentioned in the aforementioned French patent application.

The system SYS also includes a firewall device 2. A non-limiting example of an embodiment will be described in more detail below, coupled between unit 1 and the memory MM.

Firewall device 2 includes a first firewall circuit 21 associated with the first memory area ZM1, a second firewall circuit 22 associated with the second memory area ZM2, and a third firewall circuit 23 associated with the third memory area ZM3. An example of the structure of these circuits 21, 22, and 23 will be further detailed below.

But it is possible to indicate already that the first firewall circuits 21 are configurable by the second processing unit UT2, for example, in response to a command CMD.

More specifically, these first firewall circuits 21 have a first configuration wherein they authorize access to the first memory area ZM1 in the presence of a secure level access request or the presence of a non-secure level access request.

The first firewall circuit 21 can also have a second configuration where they prohibit access to the first memory area in the presence of a secure level access request and authorize access to the first memory area only in the presence of a non-secure level request.

The management of access rights by the firewall device 2 is illustrated in more detail in FIGS. 2 to 9.

In these figures, the reference TR designates a memory access request or transaction which can be emitted by the first processing unit UT1 or by the second processing unit UT2 and is intended for one of the three memory areas ZM1, ZM2, ZM3.

The letter (S) circuit that the transaction or memory access request TR, whether in writing or in reading, has a secure level.

The letters (NS) mean that this transaction has a non-secure level.

Figure 2:
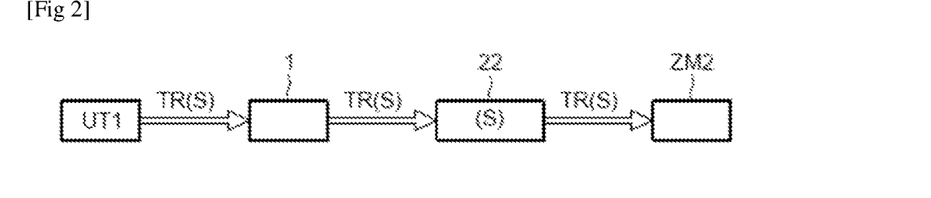
FIGS. 2-9 are block diagrams of embodiment management of access rights by a firewall device.

In FIG. 2, a secure level (S) transaction TR is emitted by the first processing unit UT1 which has a secure execution context. This secure level transaction TR is intended for the second memory area ZM2. It is relayed by the unit 1 without degrading its security level, that is to say at the output of the unit 1 it retains a secure level.

And, as the second firewall circuit 22 are configured to allow only transactions having a secure level (S) to pass, the transaction TR is indeed authorized to access the second memory area ZM2.

Figure 3:
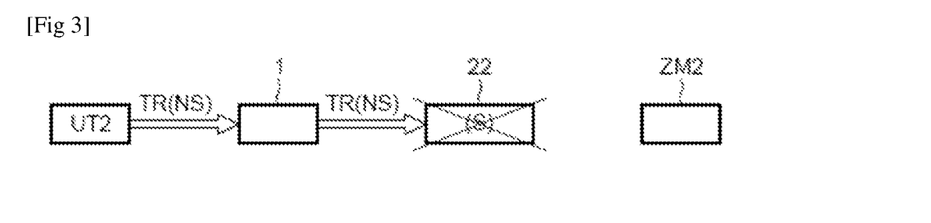

In FIG. 3, a non-secure (NS) level transaction TR is emitted by the unit UT2 and is also intended for the second memory area ZM2.

After passing through the unit 1, this transaction TR reaches the second firewall circuit 22. However, as the transaction has a non-secure level, the firewall circuit 22 prohibits access of this transaction TR to the second memory area ZM2.

Figure 4:
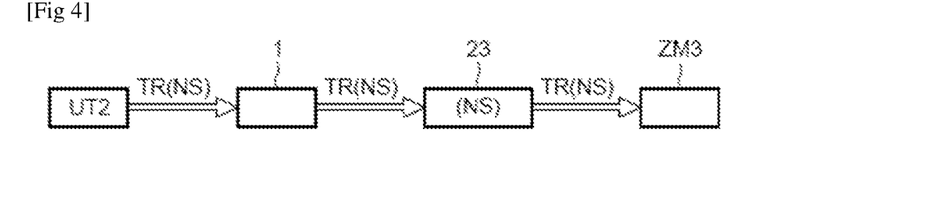

In FIG. 4, a non-secure (NS) level transaction TR is emitted by the second processing unit UT2 to the third memory area ZM3.

After passing through the unit 1, the latter is authorized to access the third memory area ZM3 by the third firewall circuit 23.

Figure 5:
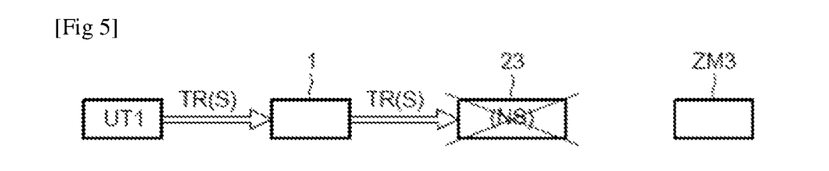

On the other hand, as illustrated in FIG. 5, a secure level transaction TR emitted by the first processing unit UT1 and towards this third memory area ZM3 is blocked by the third firewall circuit 23.

Figure 6:
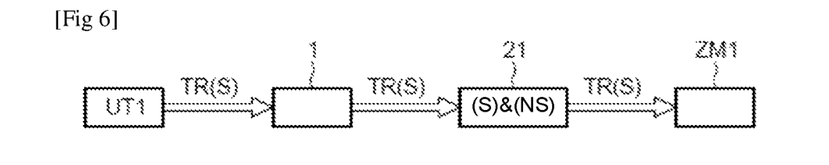

In FIG. 6, the first firewall circuits 21 are in their first configuration (i.e., they will authorize access to the first memory area ZM1 for a transaction TR which is either secure (S) or non-secure (NS)).

Thus, a secure transaction TR emitted by the first processing unit UT1 after having passed through the unit 1 without having its security level degraded, crosses the first firewall circuit 21 and accesses the first memory area ZM1.

Figure 7:
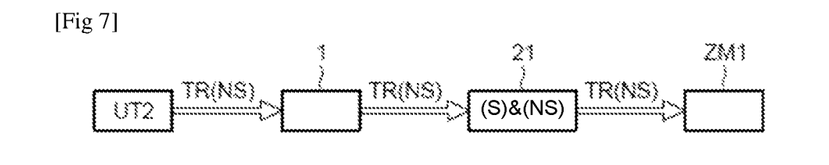

As illustrated in FIG. 7, this is also the case for a non-secure transition TR emitted by the second processing unit UT2 since the first firewall circuits 21 are in their first configuration.

Figure 8:
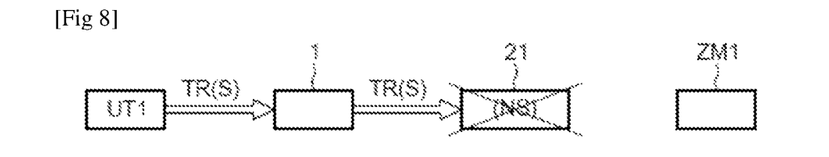
Figure 9:
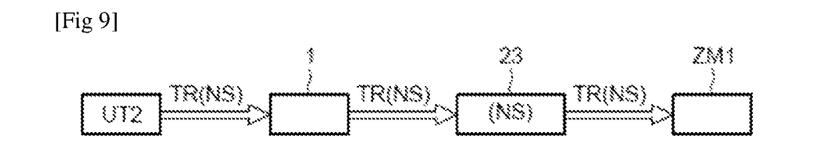

On the other hand, as illustrated in FIGS. 8 and 9, the first firewall circuits 21 are in their second configuration wherein they only authorize access to the first memory area ZM1 for transitions or access requests TR having a non-secure level.

Also, a secure access request TR emitted by the unit UT1 will be blocked by the first firewall circuit 21 and will not reach the first memory area ZM1 (FIG. 8).

On the other hand, a non-secure transition emitted by the second processing unit UT2 will this time be able to reach the first memory area ZM1 (FIG. 9).

The configuration of the system allocating to the second processing unit the management of the memory region RGM and to the first processing unit the second memory area ZM2 intended to be a secure memory area, can, for example, be defined during the initialization of the system by a security entity, for example, a designated master piece of equipment.

Alternatively, it is possible for the management of the access rights of the first memory area ZM1 to be delegated to the second processing unit during operation. In this respect, the present invention is compatible with the invention described in the French patent application entitled "Management of a memory firewall in a system on a chip," filed on the same day as the present patent application in the names of STMicroelectronics (Alps) SAS" and STMicroelectronics (Grand Ouest) SAS.

The present invention is also compatible with the invention described in the patent application entitled "Method for executing a software program by a processing unit including a compilation phase" and filed on the same day as the present patent application in the name of STMicroelectronics (Grand Ouest) SAS.

Indeed, one aspect of this invention object of this patent application, proposes in particular, a processing unit adapted to have a secure access right level execution context and a non-secure access right level execution context, the processing unit being, for example, capable of processing instructions having an exclusively secure access right level and being, in a hardware manner, configured so that execution of the instructions can allow access to secure access right level memory areas, and cannot allow access to non-secure access right level memory areas.

However, the instructions with an exclusively secure access right level may nevertheless allow here access to the first memory area ZM1 in the first configuration of the firewall.

Figure 10:
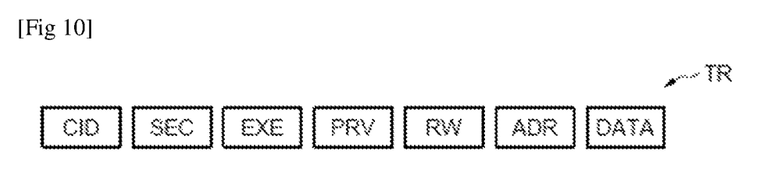
FIG. 10 is a block diagram of an embodiment content of a transaction or access request.

Reference is now made more particularly to FIG. 10 to describe an example of the content of a transaction or access request TR.

In general, here, each transaction TR emitted by a master piece of equipment, such as the first unit UT1 or the second unit UT2 includes an addressing field ADR whose content is intended to address the destination memory area of this transaction.

Each transaction TR includes identification piece of information CID of the master piece of equipment emitter of this transaction, a security indication SEC, an indication EXE intended to indicate whether or not this transaction contains an execution instruction, a privilege piece of information PRV and a piece of information RW indicating whether it is a read or write transaction as well as an addressing field ADR and a data field DATA.

The security level of the transaction is therefore defined by the security indication SEC which can be for example, 1 bit.

Figure 11:
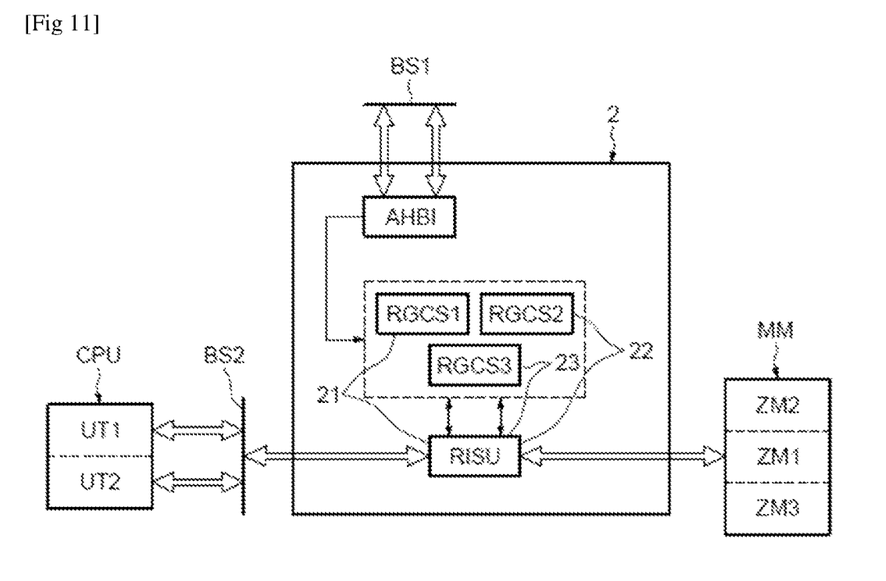
FIG. 11 is a block diagram of an embodiment firewall device.

In FIG. 11, it can be seen that the first firewall circuit 21 of the firewall device 2 include one or more registers RGCS1 associated with verification circuit RISU.

The second firewall circuit 22 include one or more registers RGCS2 associated with the verification circuit RISU and the third firewall circuit 23 include one or more registers RGCS3 associated with the verification circuit RISU.

The registers RGCS1 are associated with the first memory area ZM1, the registers RGCS2 are associated with the second memory area ZM2 and the registers RGCS3 are associated with the third memory area ZM3.

And, these registers contain the pieces of information representative of the S or NS security level.

The transactions TR emitted by the various master pieces of equipment UT1, UT2 are transmitted on a bus BS2 then to the verification circuit RISU.

The verification circuit is configured to compare the indication SEC of a request for access to a memory area with the information contained in the corresponding set of registers RGCS1 to authorize or prohibit access to the memory area according to the comparison result.

By way of example, the verification circuit RISU may include one or more logic circuits.

The modification of the contents of the registers RGCS1 to configure the first firewall circuit 21 can be obtained by a command transiting on a bus BS1, for example, a bus of the AHB type ("Advanced High Performance Bus"), via an AHBI interface.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A system, comprising:
a first processing unit configured to:
operate in a secure mode, and
generate memory access requests having a secure level;
a second processing unit configured to:
operate in a non-secure mode, and
generate memory access requests having a non-secure level;
a memory storage having a first memory area shared between the first processing unit and the second processing unit; and
a firewall device coupled between the memory storage, the first processing unit, and the second processing unit, the firewall device comprising a first firewall circuit associated with the first memory area, the first firewall circuit having a first configuration and a second configuration configurable by the second processing unit,
wherein in the first configuration, access to the first memory area is authorized in response to a presence of a secure level access request or a non-secure level access request, and
wherein in the second configuration, access to the first memory area is prohibited in response to the presence of a secure level access request and access to the first memory area is authorized in response to the presence of the non-secure level access request.

2. The system of claim 1, wherein the memory storage comprises a memory region allocated to the second processing unit, the memory region containing the first memory area, and wherein the second processing unit is configured to define the first memory area within the memory region.

3. The system of claim 2, wherein the memory storage comprises a second memory area allocated to the first processing unit, wherein the memory storage comprises a third memory area reserved for the second processing unit, and wherein the firewall device comprises:
a second firewall circuit associated with the second memory area, the second firewall circuit configured to authorize access to the second memory area only in response to a presence of secure level requests, and
a third firewall circuit associated with the third memory area, the third firewall circuit configured to authorize access to the third memory area only in response to a presence of non-secure level requests.

4. The system of claim 3, wherein the memory access requests comprises indications representative of the secure level or the non-secure level, wherein the second firewall circuit and the third firewall circuit comprises:
sets of registers, respectively, associated with the first memory area, the second memory area, and the third memory area, the sets of registers comprising information data representative of secure access rights, non-secure access rights, or a combination thereof, to the first memory area, the second memory area, or the third memory area; and a verification circuit configured to:
compare an indication of a request for access to an associated memory area with the information data contained in a corresponding set of registers, and
authorize or prohibit access to the associated memory area based on the comparison.

5. The system of claim 4, wherein contents of a register associated with the first memory area is modifiable based on a command from the second processing unit.

6. The system of claim 1, further comprising:
a memory management circuit coupled between the firewall device, the first processing unit, and the second processing unit, the memory management circuit configured to not degrade the security level of a secure level access request.

7. The system of claim 1, further comprising a processor having:
a first operating system configured to operate in a secure level execution context by the first processing unit; and
a second operating system configured to operate in a non-secure level execution context by the second processing unit.

8. The system of claim 1, wherein the system is incorporated within a system on a chip (SoC) circuit.

9. A method, comprising:
operating, a first processing unit, in a secure mode;
generating, by the first processing unit, memory access requests having a secure level;
operating, a second processing unit, in a non-secure mode;
generating, by the second processing unit, memory access requests having a non-secure level; and
configuring, by the second processing unit, a first firewall circuit in a first configuration or a second configuration, the first firewall circuit being a circuit of a firewall device, the first firewall circuit associated with a first memory area of a memory storage, the first memory area shared between the first processing unit and the second processing unit,
wherein in the first configuration, access to the first memory area is authorized in response to a presence of a secure level access request or a non-secure level access request, and
wherein in the second configuration, access to the first memory area is prohibited in response to the presence of a secure level access request and access to the first memory area is authorized in response to the presence of the non-secure level access request.

10. The method of claim 9, wherein the memory storage comprises a memory region allocated to the second processing unit, the memory region containing the first memory area, and wherein the second processing unit is configured to define the first memory area within the memory region.

11. The method of claim 10, wherein the memory storage comprises a second memory area allocated to the first processing unit, wherein the memory storage comprises a third memory area reserved for the second processing unit, and wherein the firewall device comprises a second firewall circuit associated with the second memory area, wherein the firewall device comprises a third firewall circuit associated with the third memory area, the method further comprising:

authorizing access, by the second firewall circuit, to the second memory area only in response to a presence of secure level requests, and
authorizing access, by the third firewall circuit, to the third memory area only in response to a presence of non-secure level requests.

12. The method of claim 9, further comprising:
preventing a degradation, by a memory management circuit, of the security level of a secure level access request, the memory management circuit coupled between the firewall device, the first processing unit, and the second processing unit.

13. The method of claim 9, further comprising:
operating, by a first operating system of the first processing unit, a secure level execution context; and
operating, by a second operating system of the second processing unit, a non-secure level execution context.

14. The method of claim 9, wherein the first processing unit, the second processing unit, the memory storage, and the firewall device are part of a system incorporated within a system on a chip (SoC) circuit.

15. A system on a chip (SoC) circuit, comprising:
a first processing unit configured to:
operate, using a first operating system, a secure level execution context in a secure mode, and
generate memory access requests having a secure level;
a second processing unit configured to:
operate, using a second operating system, a non-secure level execution context in a non-secure mode, and
generate memory access requests having a non-secure level;
a memory storage having a first memory area shared between the first processing unit and the second processing unit; and
a firewall device comprising a first firewall circuit associated with the first memory area, the first firewall circuit configurable by the second processing unit,
wherein in a first configuration, access to the first memory area is authorized in response to a presence of a secure level access request or a non-secure level access request, and
wherein in a second configuration, access to the first memory area is prohibited in response to the presence of a secure level access request and access to the first memory area is authorized in response to the presence of the non-secure level access request.

16. The SoC circuit of claim 15, wherein the memory storage comprises a memory region allocated to the second processing unit, the memory region containing the first memory area, and wherein the second processing unit is configured to define the first memory area within the memory region.

17. The SoC circuit of claim 16, wherein the memory storage comprises a second memory area allocated to the first processing unit, wherein the memory storage comprises a third memory area reserved for the second processing unit, and wherein the firewall device comprises:
a second firewall circuit associated with the second memory area, the second firewall circuit configured to authorize access to the second memory area only in response to a presence of secure level requests, and
a third firewall circuit associated with the third memory area, the third firewall circuit configured to authorize access to the third memory area only in response to a presence of non-secure level requests.

18. The SoC circuit of claim 17, wherein the memory access requests comprises indications representative of the secure level or the non-secure level, wherein the first firewall circuit, the second firewall circuit, and the third firewall circuit comprises:
- sets of registers, respectively, associated with the first memory area, the second memory area, and the third memory area, the sets of registers comprising information data representative of secure access rights, non-secure access rights, or a combination thereof, to the first memory area, the second memory area, or the third memory area; and
- a verification circuit configured to:
  - compare an indication of a request for access to an associated memory area with the information data contained in a corresponding set of registers, and
  - authorize or prohibit access to the associated memory area based on the comparison.

19. The SoC circuit of claim 18, wherein contents of a register associated with the first memory area is modifiable based on a command from the second processing unit.

20. The SoC circuit of claim 15, further comprising:
- a memory management circuit coupled between the firewall device, the first processing unit, and the second processing unit, the memory management circuit configured to not degrade the security level of a secure level access request.

* * * * *